(12) United States Patent
Thornér et al.

(10) Patent No.: US 12,038,829 B1
(45) Date of Patent: Jul. 16, 2024

(54) TESTING FOR DYNAMICALLY GENERATED CONTENT

(71) Applicant: ZEMBULA, INC., Portland, OR (US)

(72) Inventors: Carl-Einar Ingemar Thornér, Happy Valley, OR (US); Robert Jenkin Haydock, Portland, OR (US)

(73) Assignee: ZEMBULA, INC., Portland, OR (US)

( * ) Notice: Subject to any disclaimer, the term of this patent is extended or adjusted under 35 U.S.C. 154(b) by 35 days.

(21) Appl. No.: 18/063,256

(22) Filed: Dec. 8, 2022

Related U.S. Application Data

(60) Provisional application No. 63/265,257, filed on Dec. 10, 2021.

(51) Int. Cl.
*G06F 11/36* (2006.01)

(52) U.S. Cl.
CPC ...... *G06F 11/3664* (2013.01); *G06F 11/3688* (2013.01)

(58) Field of Classification Search
CPC .......... G06F 11/3664; G06F 11/3688
See application file for complete search history.

(56) References Cited

U.S. PATENT DOCUMENTS

| | | | | |
|---|---|---|---|---|
| 10,810,110 B1* | 10/2020 | Thomas | | G06F 11/3664 |
| 10,963,470 B2* | 3/2021 | Jamshidi | | G06F 16/24578 |
| 2013/0254015 A1* | 9/2013 | Juda | | G06Q 30/02 |
| | | | | 705/14.42 |
| 2014/0365830 A1* | 12/2014 | Rajan | | G06F 11/3684 |
| | | | | 714/38.1 |
| 2015/0106078 A1* | 4/2015 | Chang | | G06F 16/35 |
| | | | | 704/9 |
| 2015/0106156 A1* | 4/2015 | Chang | | G06Q 30/0201 |
| | | | | 705/7.29 |
| 2015/0106157 A1* | 4/2015 | Chang | | G06F 40/237 |
| | | | | 705/7.29 |
| 2015/0379014 A1* | 12/2015 | Xu | | G06F 16/957 |
| | | | | 707/711 |
| 2016/0299925 A1* | 10/2016 | Edwards | | G06F 16/22 |
| 2019/0019426 A1* | 1/2019 | Chambers | | H04L 67/535 |
| 2021/0117313 A1* | 4/2021 | Geary | | G06F 11/3495 |
| 2022/0100642 A1* | 3/2022 | Danthuluri | | G06F 11/3688 |
| 2023/0297496 A1* | 9/2023 | Shrikant Patwardhan | | |
| | | | | G06F 11/3692 |
| | | | | 717/124 |

FOREIGN PATENT DOCUMENTS

WO    WO-2023014282 A1 * 2/2023

\* cited by examiner

*Primary Examiner* — Matthew M Kim
*Assistant Examiner* — Indranil Chowdhury
(74) *Attorney, Agent, or Firm* — Alleman Hall & Tuttle LLP

(57) ABSTRACT

Testing of a computer-implemented dynamic content generator module operable within a computer networking environment is disclosed. According to an example, the dynamic content generator module executed by a computing system dynamically generates a content item for a test group based on a combination of test values of the test group as input to a template-rule framework. The dynamic content generator module outputs the content item for each test group. A testing module executed by the computing system associates the content item with the test values of the test group from which that content item was generated to obtain associated test result data, and outputs the associated test result data that includes the content item and associated test values.

6 Claims, 6 Drawing Sheets

TESTING FOR DYNAMICALLY GENERATED CONTENT

CROSS REFERENCE TO RELATED APPLICATIONS

This application claims priority to and the benefit of U.S. provisional application Ser. No. 63/265,257, filed Dec. 10, 2021, the entirety of which is hereby incorporated herein by reference for all purposes.

BACKGROUND

Websites, software applications, and communication channels such as email and messaging services can feature personalized content that is specifically tailored for each user. Such content can improve user experience by providing information that is more relevant or useful to the user for a given context. Personalized content can include media in the form of graphical and/or audio content that is dynamically generated in real-time or within a current session.

SUMMARY

The present disclosure relates generally to testing of a dynamic content generator module operable within a computer networking environment. According to an example, a testing method includes, at a testing module executed by a computing system: receiving an initial domain for each of a plurality of parameters of a parameter set in which the parameter set defines features of content to be generated by the dynamic content generator module; for each parameter of the parameter set, generating a plurality of test values based on the initial domain for that parameter; defining a plurality of test groups in which each test group includes a different combination of test values among the plurality of parameters of the parameter set; and providing the plurality of test groups to the dynamic content generator module.

The testing method further includes, at the dynamic content generator module executed by the computing system: for each test group, dynamically generating a content item based on the combination of test values of that test group as input to a template-rule framework; and outputting the content item for each test group.

The testing method further includes, at the testing module executed by the computing system: for each content item output by the dynamic content generator module, associating that content item with the test values of the test group from which that content item was generated to obtain associated test result data; and outputting the associated test result data that includes the content item and associated test values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
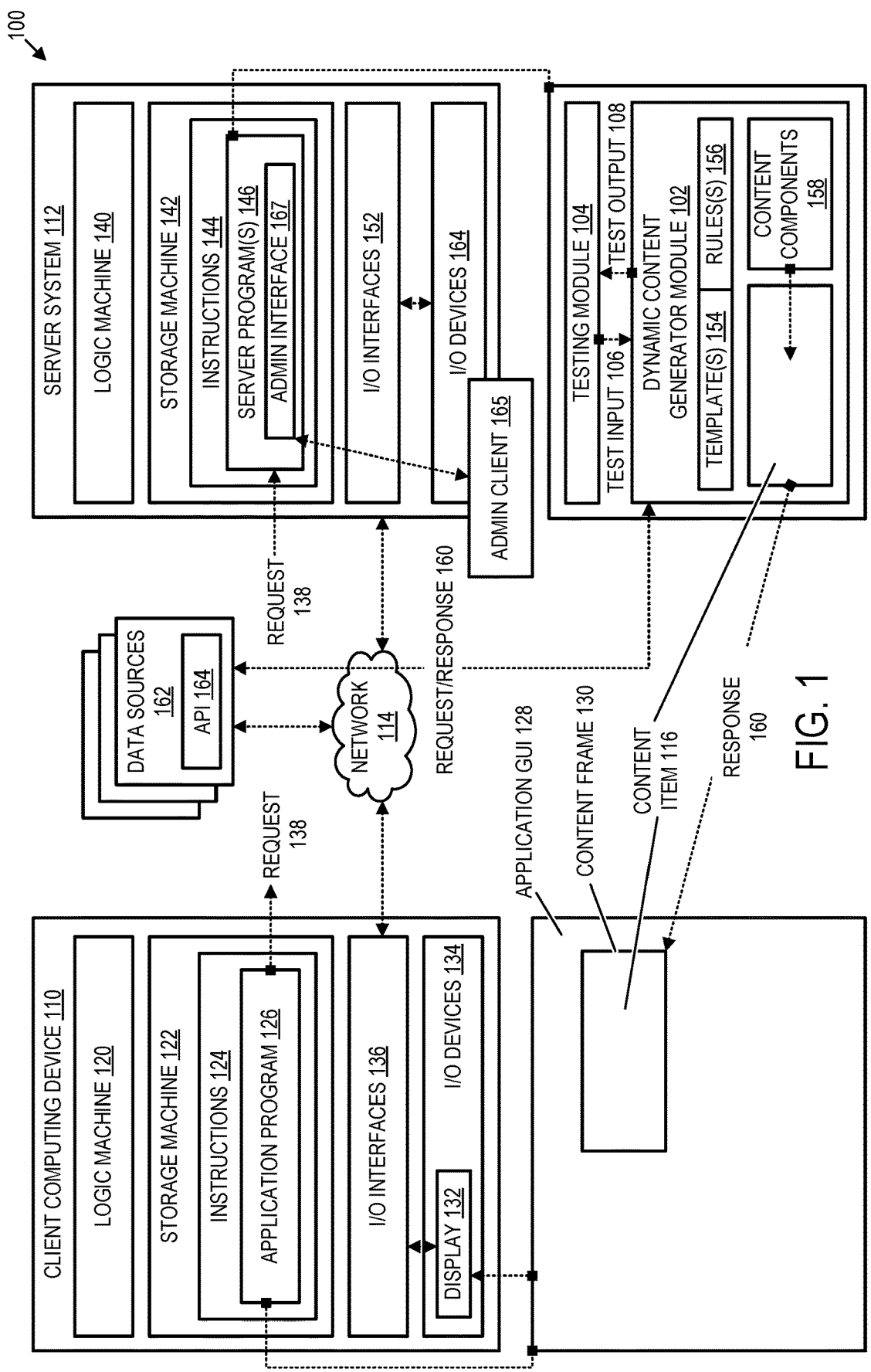
FIG. 1 is a schematic diagram depicting an example computing system implementing a dynamic content generator module and a testing module.

When creating personalized content for distribution within computer networking environments via email, messaging, applications, web applications, etc., the use of testing can be beneficial to confirm that the content is compliant or otherwise acceptable across a range of personalization scenarios. One problem with existing testing approaches is that they do not enable a range of personalization scenarios to be defined by the administrator of the test, and instead support only generic renderings of content. While some testing approaches might enable the administrator to define certain features of a test, this approach to testing is limited and does not solve the problem of testing a variety of personalization scenarios for compliance. Furthermore, none of these testing approaches enable an administrator to programmatically generate multiple testing scenarios. In addition, some existing testing approaches render content for a single client type (e.g., an email application). However, this approach falls short of the level of testing needed for live media.

Live media, sometimes referred to as live images or live content, can be implemented by a combination of decision logic, graphical elements (e.g., bitmap images and vector graphics), text and templates with replaceable content that, when rendered, change form based on a range of scenario inputs and context for a particular client at a particular time and location. As examples, the dynamic content generator module may return raw text, while in another, the generator may return html, .png image, .gif, .svg, or video of a particular size and format. The flexibility of live media creates the problem of understanding and confirming compliance of the content that is provided to and output by an individual client for each of a plurality of personalization scenarios.

Live media, as an example, can have different personalization parameters for each client user that receives the media. In the context of personalized graphical content, each image can be rendered based on HTTP parameters (e.g., that determine language, device type, accepted formats), IP address, etc., and may have a different appearance based on when and where the image is loaded. Furthermore, the same live media may also be used across different channels such as web, mobile messaging, email, and other applications, and may be presented in a format appropriate for the channel. For example, in text messaging, the live media may render as text rather than other forms of graphical content. The ability to quickly and easily test across multiple edge cases and personalization scenarios is beneficial to ensure that each end user receives a quality experience.

According to an aspect of the present disclosure, a dynamic content generator module operable within a computer networking environment can be tested through the use of multi-dimensional testing in which multiple testing scenarios can be generated by configurable inputs and context for both live media content generated in-session or in real-time and pre-generated media content. Providing the ability to define a set of multiple personalization scenarios has the potential to accelerate quality assurance testing and makes it quicker, easier, less costly, and more reliable to test edits to dynamic content generation rules or templates while gaining the confidence that the personalized content will render correctly across an entire range of personalization scenarios. Beyond testing individual pieces of media and variants thereof, there can also be a need to test an additional decision point that determines particular personalized media to be displayed from a pool of such media. The disclosed techniques seek to address these and other issues associated with testing for dynamically generated content.

Before introducing testing of a dynamic content generator module, an example of the dynamic content generator module operating within a computing networking environment is described with reference to FIG. 1.

FIG. 1 shows an example computing system 100 in which a client computing device 110 interacts with a server system 112 via a communications network 114 to obtain dynamically generated content item 116 that is presented at the client computing device. Content item 116 can include one or more content components, including graphical content components, audio content components, and computer-executable content components, as examples.

Client computing device 110 is operable by a user, and may take the form of a personal computer, mobile computing device, computer terminal, gaming system, home entertainment system, vehicle-based computer, as examples. Client computing device 110 includes a logic machine 120 and a storage machine 122 having instructions 124 stored thereon that are executable by the logic machine to perform one or more of the methods and operations described herein with respect to the client computing device.

In an example, instructions 124 includes an application program 126, which can take the form of a web browser application, an email application, a messaging application, or other suitable application program that features one or more application graphical user interfaces (GUIs), an example of which includes application GUI 128. Application GUI 128 includes a content frame 130 within which graphical components of content item 116 are presented via a graphical display 132 that is included as part of input/output devices 134 of client computing device 110 or otherwise interfaces with client computing device 110 via input/output interfaces 136 (e.g., as a peripheral device). In at least some examples, application program 126 initiates a request 138 to server system 112 for content item 116 or content components 158 thereof to be generated and returned by server system 112 to the client computing device.

Server system 112 includes one or more server computing devices remotely located from client computing device 110. Request 138 traverses network 114 and is received by server system 112. Server system 112 includes a logic machine 140 and a storage machine 142 having instructions 144 stored thereon that are executable by the logic machine to perform one or more of the methods and operations described herein with respect to the server system. In an example, instructions 144 include one or more server programs 146, which can include a dynamic content generator module 102 and a testing module 104, among other suitable program components. Storage machine 142 can also store local data resources, including data and/or content components that can be combined with data and/or content components obtained from remote data sources to dynamically generate content item 116.

The one or more server programs 146 receives request 138 via input/output interfaces 152. Request 138 can include a variety of information that can define a personalization scenario for client computing device 110. Examples of such information are described in further detail with reference to FIG. 3. However, such information can include any suitable information that can be used by server system 112 to retrieve and/or or generate content components 158 that can be combined to obtain content item 116 that is personalized for the client user of client computing device 110.

In response to request 138 including the information indicated by or otherwise associated with the request, dynamic content generator module 102 implements one or more templates 154 and/or one or more rules 156 to select, request, and receive 160 applicable data from one or more remote data sources 162 and/or local data sources (e.g., of storage machine 142), and to generate and transmit content item 116 to client computing device 110. Remote data sources 162 may be hosted at one or more remote computing devices (e.g., servers). Requests indicated at 160 can take the form of application programming interface (API) requests to an API 164 of each of the one or more data sources 162 to retrieve applicable data. Dynamic content generator module 102 processes the data and/or content components received from data sources 162 and/or from local storage by applying one or more of the templates 154 and/or rules 156 to obtain processed data. In at least some examples, data returned by data sources 162, data retrieved from local storage, and/or the processed data can include one or more of content components 158.

In at least some implementations, rules 156 can include a set of rule packages in which each rule package is associated with a particular type of media content to be generated by the dynamic content generator module. The particular rule package used by the dynamic content generator module can be selected by the generator module based on input received from a requesting client device or the testing module. Each rule package can define which template is selected and used by the dynamic content generator module to generate a media content item.

The content item 116 generated at server system 112 by dynamic content generator module 102 can take the form of pre-generated and/or live media that features graphical and/or or audio content. The server system 112 sends content item 116 to client computing device 110 as a response 160 that traverses network 114. Client computing device 110 receives response 160 containing content item 116 or content components 158 thereof, and presents the content item. For example, graphical content of content item 116 can be presented within a content frame 130 within application GUI 128 via display 132. However, it will be understood that graphical content can be presented at a client device using other suitable techniques.

In at least some examples, templates 154 and/or rules 156 can be defined by an administrator user. As an example, an administrator client 165 (e.g., a user operated client device) can interact with an administrator interface 167 of server programs 146 to define aspects of templates 154 and/or rules 156. Administrator client 165 can interact with server system 112 via one or more integrated input/output devices or peripheral devices 164 interfacing with input/output interfaces 152, or administrator client 165 can be remotely located as a client computing device that interacts with server system 112 via input/output interfaces 152 over network 114.

Testing module 104 can be used by the administrator user to test dynamic content generator module 102, including templates 154 and/or rules 156 to be implemented by module 102. Such testing can be performed using test input data 106 that is generated by testing module 104 and provided to dynamic content generator module 102. Test input data 106 can include a plurality of test groups that define a range of personalization scenarios, as described in further detail with reference to FIGS. 2 and 3. Test output data 108 can be generated by dynamic content generator module 102 based on test input data 106 in combination with templates 154 and/or rules 156. Test output data 108 can include respective content items generated by dynamic content generator module 102 for each of the plurality of test groups.

In at least some implementations, test output data 108 can be formatted and transmitted from dynamic content generator module 102 to testing module 104 via network 114 in the same manner as used for delivering content items to client computing devices. For example, dynamic content generator module 102 can support a variety of data formatting protocols and a variety of data transport protocols that are selected for each personalization scenario. Dynamic content generator module 102 can feature one or more APIs by which test input data 106 is received and test output data 108 is output. Such APIs may be the same as those available for use by client computing devices to obtain dynamically generated content, such as content item 116. To facilitate delivery of content items generated by dynamic content generator module 102 to testing module 104 across network 114 as part of testing, server system 112 can include or otherwise utilize one or more intermediate proxy servers. Accordingly, it will be understood that server system 112 can include a plurality of server computing devices that are geographically distributed, in at least some examples.

Figure 2:
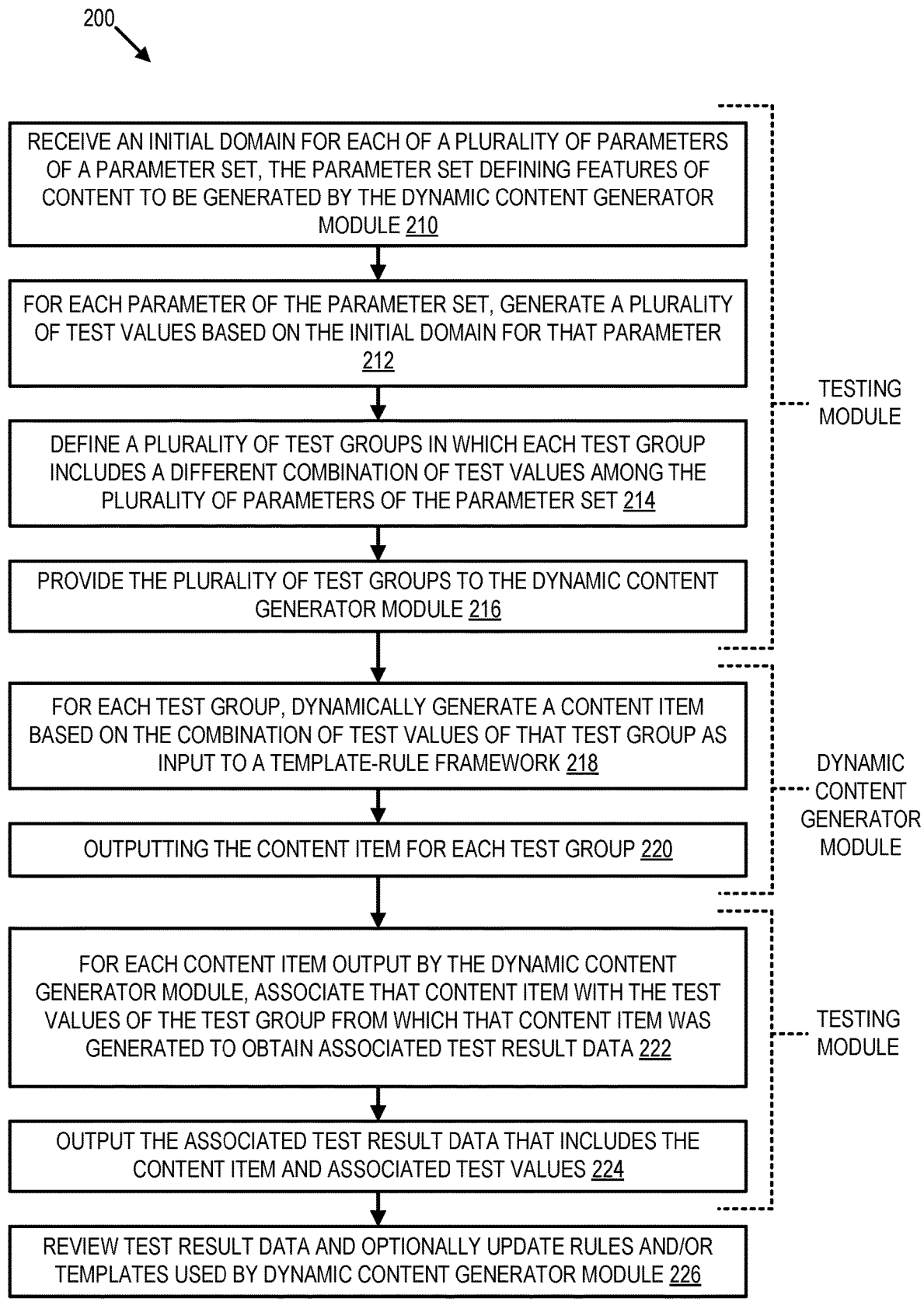
FIG. 2 is a flow diagram of an example method that can be performed by the computing system of FIG. 1.

FIG. 2 is a flow diagram of an example method 200 for testing a dynamic content generator module operable within a computer networking environment. Method 200 can be performed by a computing system of one or more computing devices. As an example, the computing system can refer to computing system 100 or server system 112 of FIG. 1. The computing system performing method 200 can execute instructions that include the dynamic content generator module (e.g., 102 of FIG. 1) and a testing module (e.g., 104 of FIG. 1) as components of the instructions. Within FIG. 2, operations performed by the computing system executing the dynamic content generator module and the testing module are schematically depicted.

At the testing module executed by the computing system, method 200 includes, at 210, receiving an initial domain for each of a plurality of parameters of a parameter set. Each parameter of the parameter set represents a different dimension of the dynamically generated content that can be tested by use of method 200. As described in further detail with reference to FIG. 3, general categories of parameters can include: (1) content request parameters, (2) media parameters, (3) client parameters, (4) context parameters, and (5) other suitable parameters.

The initial domain received at 210 can be defined by the administrator user and/or retrieved from data storage. The initial domain can include one or more ranges of test values and/or one or more discrete test values for a given parameter. The parameter set including any suitable quantity of parameters defines features of content to be generated by the dynamic content generator module.

As an example, the administrator user can utilize a set of administrator tools of an administrator interface (e.g., 167 of FIG. 1) to define the initial domain for each parameter being tested. The administrator interface can also be used to define the templates and/or rules (e.g., 154, 156 of FIG. 1) to be implemented by the dynamic content generator module as part of the test. Administrator tools can be accessed via one or more graphical user interfaces of the administrator interface, as an example.

At the testing module executed by the computing system, method 200 includes, at 212, for each parameter of the parameter set, generating a plurality of test values based on the initial domain for that parameter. As an example, where an initial domain for a parameter that identifies a quantity of text characters of a name of the client user includes a range of values between 2 and 20, the test values generated at operation 212 may include a character strings having 2, 10, and 20 characters. As shown by this example, the testing module can be configured to generate test values that are at extreme edges of the range for the initial domain, as well as other suitable quantity of test values within that range (e.g., at predefined intervals across the range).

As another example, where an initial domain for a parameter that identifies a geographic region of the client user includes a set of discrete geographic regions (e.g., countries, states, cities, etc.), the test values generated at operation 212 may include all of the discrete geographic regions of the initial domain or a random sampling thereof. In this example, the geographic regions of the initial domain do not have a particular order or sequence within the initial domain, thereby potentially necessitating that each of the discrete values of the initial domain be tested. However, it will be understood that sampling of the initial domain can be used to reduce the quantity of tests conducted while providing a suitable level of confidence in the test results.

At the testing module executed by the computing system, method 200 includes, at 214, defining a plurality of test groups in which each test group includes a different combination of test values among the plurality of parameters of the parameter set. Accordingly, each test group can be referred to as a different personalization scenario to be tested. As described in further detail with reference to FIG. 3, the quantity of test groups defined at operation 214 can include some or all combinations of the test values across the parameter set. Where all combinations are defined for the test groups, the quantity of test groups can be represented by the product of test values of each parameter of the parameter set. Thus, it will be appreciated that testing a parameter set of tens, hundreds, or more parameters that each have one or more test values can result in a relatively large number of test groups that would be prohibitive to test in the absence of the testing techniques disclosed herein.

At the testing module executed by the computing system, method 200 includes, at 216, providing the plurality of test groups to the dynamic content generator module. In at least some implementations, each test group of the plurality of test groups can be provided by the testing module to the dynamic content generator module via a communications network according to a particular format and/or transport protocol that is selected by the testing module based on the test group. Information defining aspects of the test group may be provided by the testing module as a request that is received by the dynamic content generator module via an API.

At the dynamic content generator module executed by the computing system, method 200 includes, at 218, for each test group, dynamically generating a content item based on the combination of test values of that test group as input to a template-rule framework. For example, the template-rule framework can be implemented by the dynamic content generator module as previously described templates 154 and/or rules 156 of FIG. 1.

The dynamic content generator module may be configured to process test groups in series or in parallel. Such processing can be identical to the processing provided by the dynamic content generator module to dynamically generate personalized content for clients (e.g., client computing device 110 of FIG. 1). In at least some implementations, multiple instances of the dynamic content generator module can be instantiated to process respective test groups.

At the dynamic content generator module executed by the computing system, method 200 includes, at 220, outputting the content item for each test group. In at least some implementations, the content item can be output by the dynamic content generator module transmitting the content item to the testing module 104 via a communications network according to a particular format and/or transport protocol that is based, at least in part, on information indicated by the particular test group. The content item output at operation 220 can be stored in data storage by the testing module for later use or processing.

At the testing module executed by the computing system, method 200 includes, at 222, for each content item output by the dynamic content generator module, associating that content item with the test values of the test group from which that content item was generated to obtain associated test result data. Additionally, in at least some examples, the associated test result data can include identifiers of the templates and/or rules implemented by the dynamic content generator module. While operation 222 is described with reference to the testing module, in other implementations operation 222 can be performed by the dynamic content generator module or in combination with the testing module.

At the testing module executed by the computing system, method 200 includes, at 224, outputting the associated test result data that includes the content item and associated test values. As an example, the content item and associated test values can be output via a graphical display and/or audio device for review by an administrator user. In at least some examples, content items generated for two or more test groups can be presented side-by-side by the administrator interface to enable comparison of different personalization scenarios.

As another example, the content item can be programmatically reviewed by a review component of the testing module. In this example, the review component can include machine vision and/or machine learning components that determine whether the content item passes or fails testing criteria. In these examples, training data in the form of content items labeled as acceptable and unacceptable can be provided to the review component as part of a training phase or for use in directly comparing the content items of the training data to content items generated by the dynamic content generator module as part of the test.

At 226, the testing data including the content item and the associated test values can be reviewed by the administrator user and/or a review component of the testing module. Based on this review, method 200 can additionally include receiving an evaluation input for each content item output by the dynamic content generator module based on the associated test result data of that content item. The evaluation input can indicate a passed or failed test result based on testing criteria. For failed tests, the template-rule framework implemented by the dynamic content generator module can be updated based on the evaluation input indicating the failed test result. The associated test data of a failed test (and/or all test data of the test group) can be used to retest the dynamic content generator module implementing the updated template-rule framework to determine whether the generated content item(s) pass the testing criteria.

Figure 3:
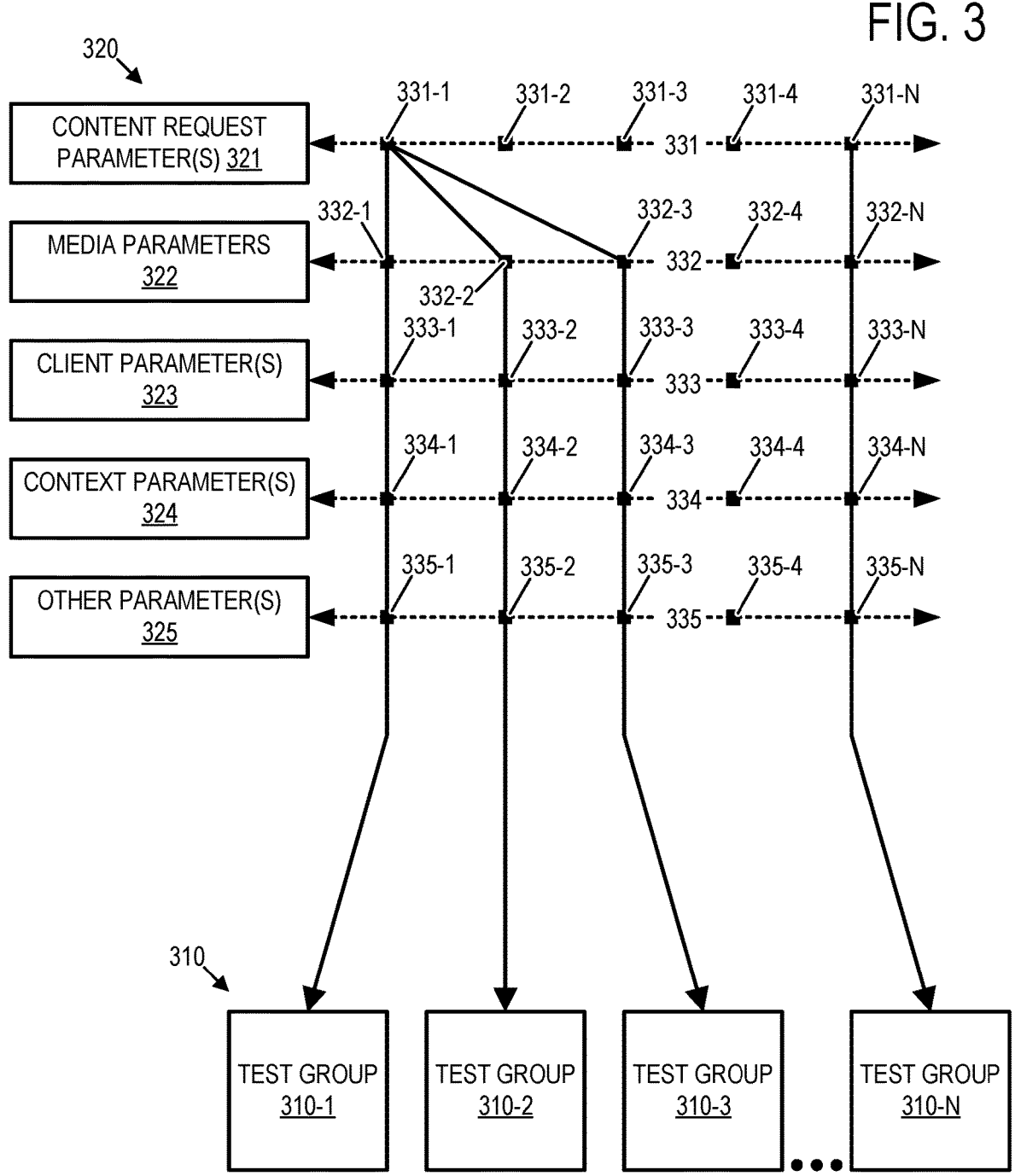
FIG. 3 is a schematic diagram depicting a plurality of test groups that can be defined by the testing module for use by the dynamic content generator module.

FIG. 3 is a schematic diagram depicting a plurality of test groups 310 that can be generated by the testing module for a set of parameters 320 that defines features of the content to be generated by the dynamic content generator module. Test groups 310 correspond to different personalization scenarios that serve as input to the dynamic content generation module. Such features of the content can include how the content is requested, how the content is transmitted over a network, the subject matter of media contained in the content, and the format of the content.

In FIG. 3, parameter set 320 includes a plurality of example parameters including one or more content request parameters 321, one or more media parameters 322, one or more client parameters 323, one or more context parameters 324, and one or more other parameters 325. It will be understood that a parameter set can include different parameters and/or a greater or lesser quantity of parameters than example parameter set 320. For example, parameters 321-325 can represent general parameter categories that each contain a plurality of parameters (e.g., sub-parameters).

Content request parameters 321 can be used to define how the testing module requests the content from the dynamic content generator module, thereby enabling an administrator to test how a client device requests the content when the dynamic content generator module is deployed in a networking environment. Content request parameters 321 can include one or more code blocks of instructions executable by a client device to initiate the request for the content and/or a direct protocol request (e.g., HTTP request) by the client device for the content, as examples. In these examples, the testing module can execute the code blocks as part of sending the test group to the dynamic content generator module (e.g., as a content request). An example block code can include an HTML or other protocol block of code containing one or more live and/or pre-generated media calls for the content as image URLs. Another example block code can include an HTML or other protocol block of code containing iframe or object HTML elements to be replaced with live HTML, a live image, or live text as the content. The ability to test multiple content request scenarios recognizes that live and pre-generated media may be used in a wide variety of code blocks or protocol requests.

Media parameters 322 can include (1) a media type (e.g., live, pre-generated, graphical (image, video, text), audio, etc.) of the content item to be dynamically generated, (2) the format of the content item (e.g., file type, resolution, etc.), (3) a channel via which the content item is to be presented at the client (e.g., email application, SMS messaging, instant messaging, web page in browser, mobile application, desktop application, web application, etc.). As an example, live and/or pre-generated media content may render differently based on the channel that the content is served on.

Client parameters 323 can include (1) an identity of the client and/or client user, (2) a client device type, (3) an application type or version used to request and present the content at the client computing device, and (4) a protocol header of the transport protocol (e.g., HTTP) used by the client to request and receive the content. For example, transport protocols can utilize different headers for language, accepted formats, user-agent, etc., may utilize a different IP address for the transport request, and may have a different path or query parameters. As an example, an HTTP request can use a query parameter such as "?first name=Carl" (e.g., as a first name parameter) or a path "/user/12345" where 12345 may be a unique identifier. Additional examples of client parameters 323 can identify accepted media formats (.jpg, .gif, .svg, .png, .webp, etc.) and/or client feature support for inline CSS, .gif support, and other client-specific features.

Context parameters 324 can include parameters such as (1) time, (2) date, (3) location of a hypothetical client, and/or (4) proxies used to facilitate communication. Time and date can refer to a past, present, or future time or date. Location can refer to a network location (e.g., IP address or IP address range) and/or a geographic location (e.g., city, state, country, longitude/latitude, etc.).

An initial domain of test values can be defined for each parameter of parameter set 320. For example, parameter 321 has an initial domain 331 containing test values 331-1 through 331-N, parameter 322 has an initial domain 332 containing test values 332-1 through 332-N, parameter 323 has an initial domain 333 containing test values 333-1 through 333-N, parameter 324 has an initial domain 334 containing test values 334-1 through 334-N, and parameter 325 has an initial domain 335 containing test values 335-1 through 335-N.

Each test group of the plurality of test groups 310 includes a different combination of test values among the plurality of parameters of parameter set 320. For example, test group 310-1 includes test values 331-1, 332-1, 333-1, 334-1, and 335-1 of parameter 321, parameter 322, parameter 323, parameter 324, and parameter 325, respectively. Test group 310-2 includes test values 331-1, 332-2, 333-2, 334-2, and 335-2 of parameter 321, parameter 322, parameter 323, parameter 324, and parameter 325, respectively. Test group 310-3 includes test values 331-1, 332-3, 333-3, 334-3, and 335-3 of parameter 321, parameter 322, parameter 323, parameter 324, and parameter 325, respectively. Test group 310-N includes test values 331-N, 332-N, 333-N, 334-N, and 335-N of parameter 321, parameter 322, parameter 323, parameter 324, and parameter 325, respectively.

In at least some implementations, the quantity of test groups for a parameter set can be represented by the product of the quantity of test values of each parameter. For example, a parameter set of five parameters each having five test values can form 125 different combinations of test values corresponding to 3,125 test groups. It will be understood that parameters of a parameter set can have different quantities of test values relative to other parameters of the parameter set. For example, a parameter set of three parameters A, B, and C can have several test values for parameter A, dozens of test values for parameter B, and hundreds of test values for parameter C.

The initial domain of test values for a given parameter can include one or more discrete values and/or one or more value ranges. The term "value" as used herein can refer to numerical values, text values, alphanumeric values, computer-executable instructions, and/or other forms of data. Test values can refer to other data or content, and can include network addresses and/or resource identifiers at or by which other data or content components can be accessed.

The techniques and approaches described herein can be used to identify problematic renderings of live and/or pre-generated media content. For example, unreadable text of a content item may be due to text overlapping a defined area, low contrast making text unreadable for visually impaired, etc. As an illustrative example, a test group can be used to test how changing the "first name" (e.g., Carl, Subrahmanyan, or Miguel) parameter with different "language" (e.g., en, en-US, fr, se) header values impacts the content item generated by the dynamic content generator module.

Figure 4:
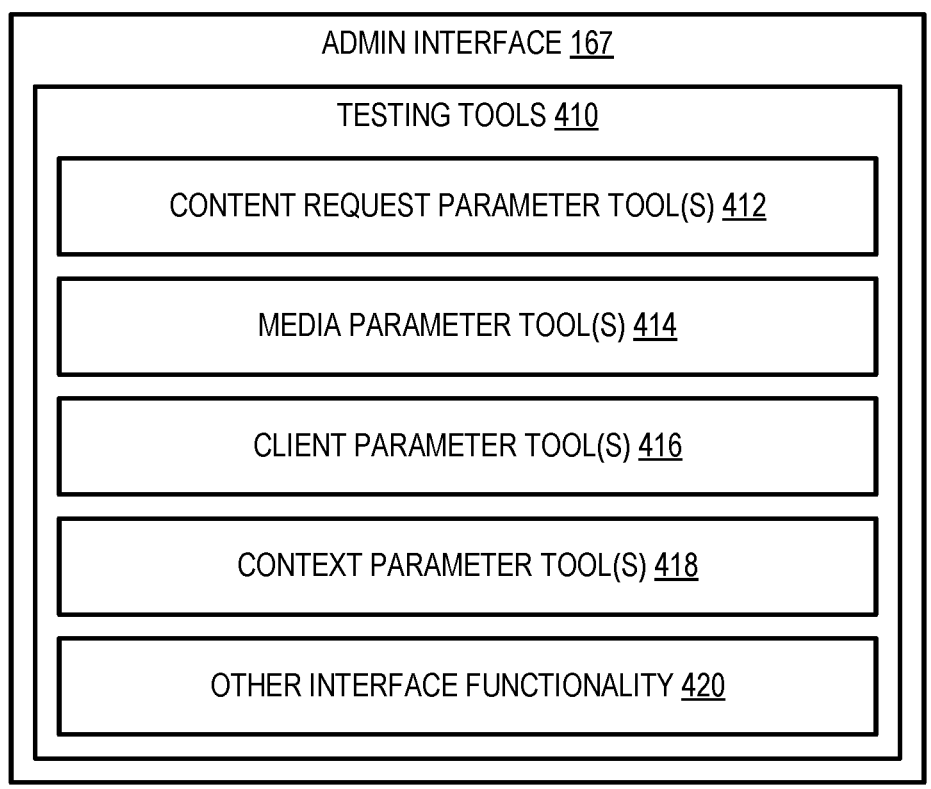
FIG. 4 is a schematic diagram depicting example features of the administrator interface of FIG. 1.

FIG. 4 is a schematic diagram depicting example features of administrator interface 167 of FIG. 1. Administrator interface 167 includes testing tools 410, which can include one or more content request parameter tools 412 that enables an administrator user to define content request parameters 321, one or more media parameter tools 414 that enables an administrator user to define media parameters 322, one or more client parameter tools 416 that enables an administrator user to define client parameters 323, one or more context parameter tools 418 that enables an administrator user to define context parameters 324, and other interface functionality 420. As examples, other interface functionality 420 can include one or more other tools that enables an administrator user to define other parameters 325; define the initial domains consistent with operation 210 of FIG. 2; save, modify, load, and initiate tests; preview content generated for testing scenarios; review test results; and update rules and/or templates used by the dynamic content generator module.

FIGS. 5A-5D depict graphical user interfaces of an example administrator interface 500, which is an example of previously described administrator interface 167 of FIGS. 1 and 4. Within FIGS. 5A-5D, administrator interface 500 includes various graphical selectors that enable administrator users to interact with the various tools and other functionality of the interfaces, including those described with reference to FIG. 4, as an example. While graphical user interfaces are provided as examples, it will be understood that an administrator interface can take other forms, including natural language interfaces, as an example.

Figure 5A:
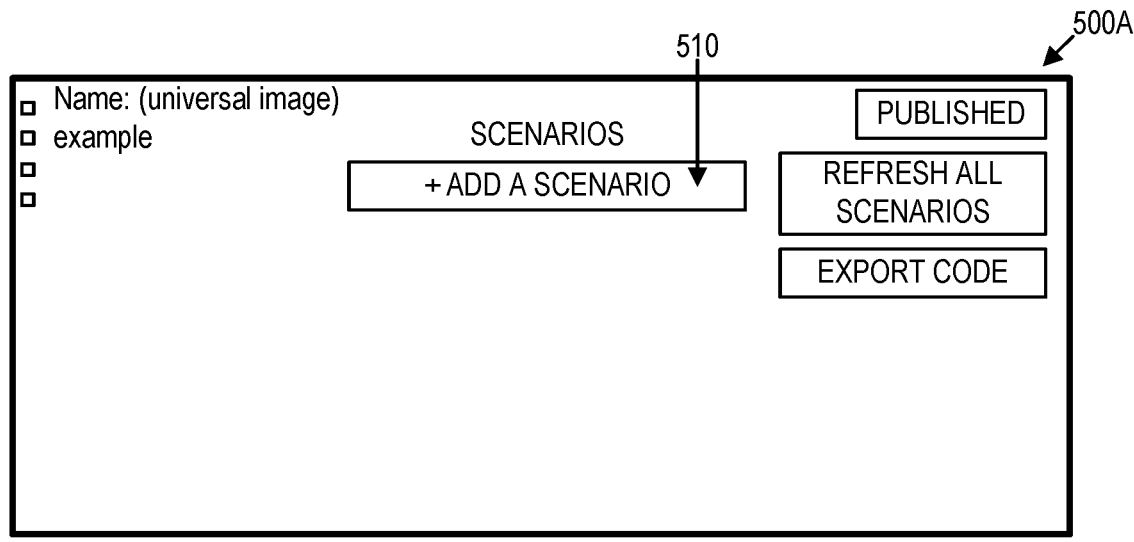
FIGS. 5A-5D depict graphical user interfaces of an example administrator interface.

FIG. 5A shows an instance of administrator interface 500A. Within FIG. 5A, a selector 510 enables a user to add a scenario for testing.

Figure 5B:
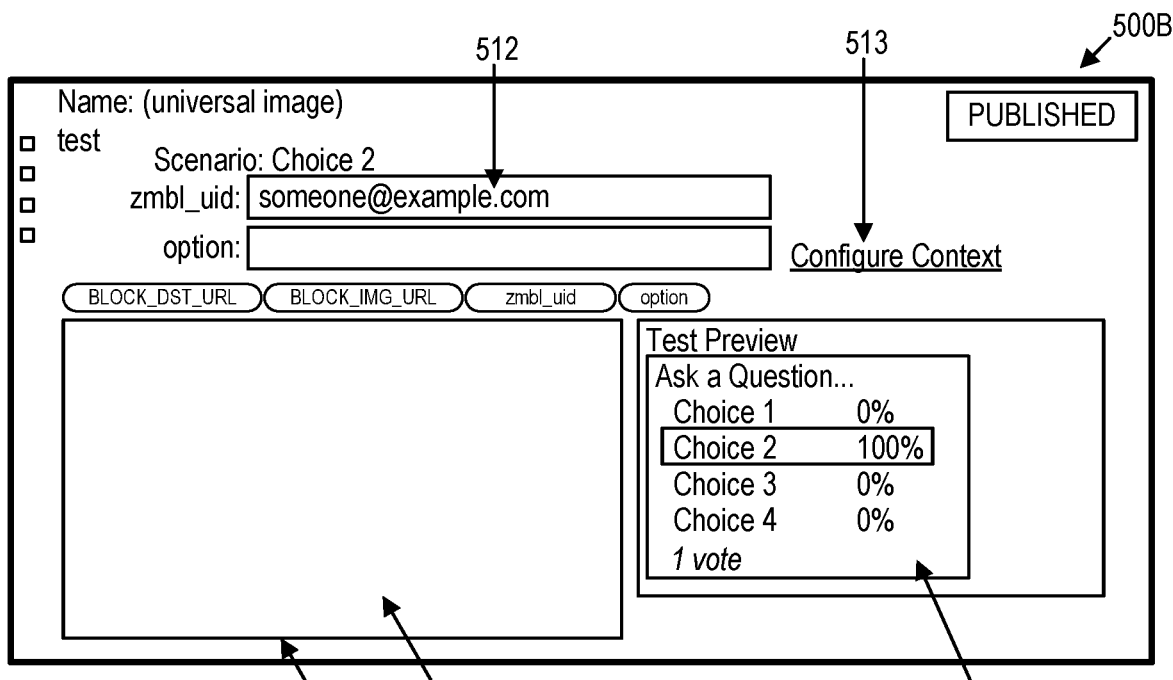

FIG. 5B shows an instance of administrator interface 500B that may be accessed by selecting selector 510 of FIG. 5A. Within FIG. 5B, a field 512 enables a user to add a UID for testing and a block field 514 that enables the user to define block code 516 for testing. Interface 500B in FIG. 5B further includes a test preview showing an example interactive graphical content item 518 in the form of a user poll to be generated by the dynamic content generator module based on the defined testing parameters of a particular scenario. Interface 500B of FIG. 5B further includes a Configure Context selector 513 that enables a user to configure a context, such as shown in FIG. 5C.

Figure 5C:
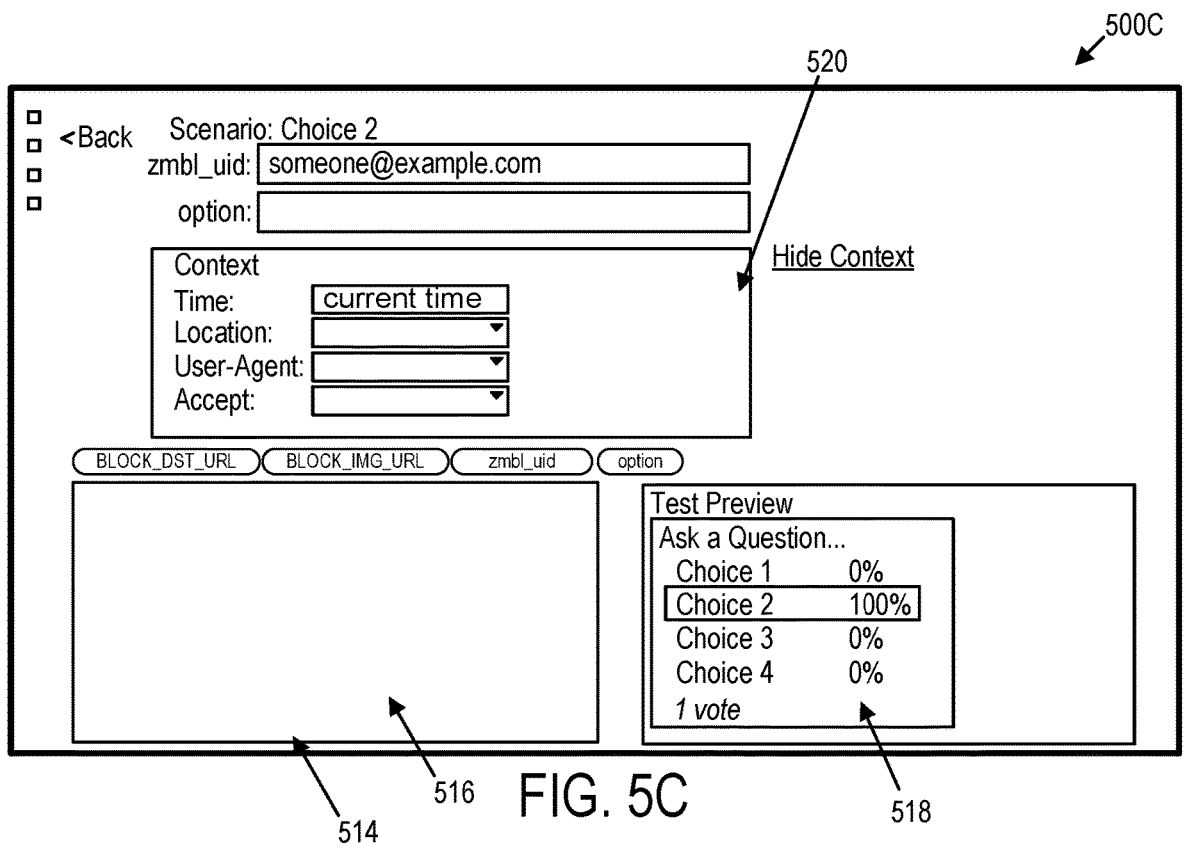

FIG. 5C shows an instance of administrator interface 500C. Within FIG. 5C, interface 500C includes a context parameter tools 520 that may be accessed by selecting selector 513 of FIG. 5B. Context parameter tools 520 enable a user to define the time, language, location, user-agent, and accepted media formats for a testing scenario.

Figure 5D:
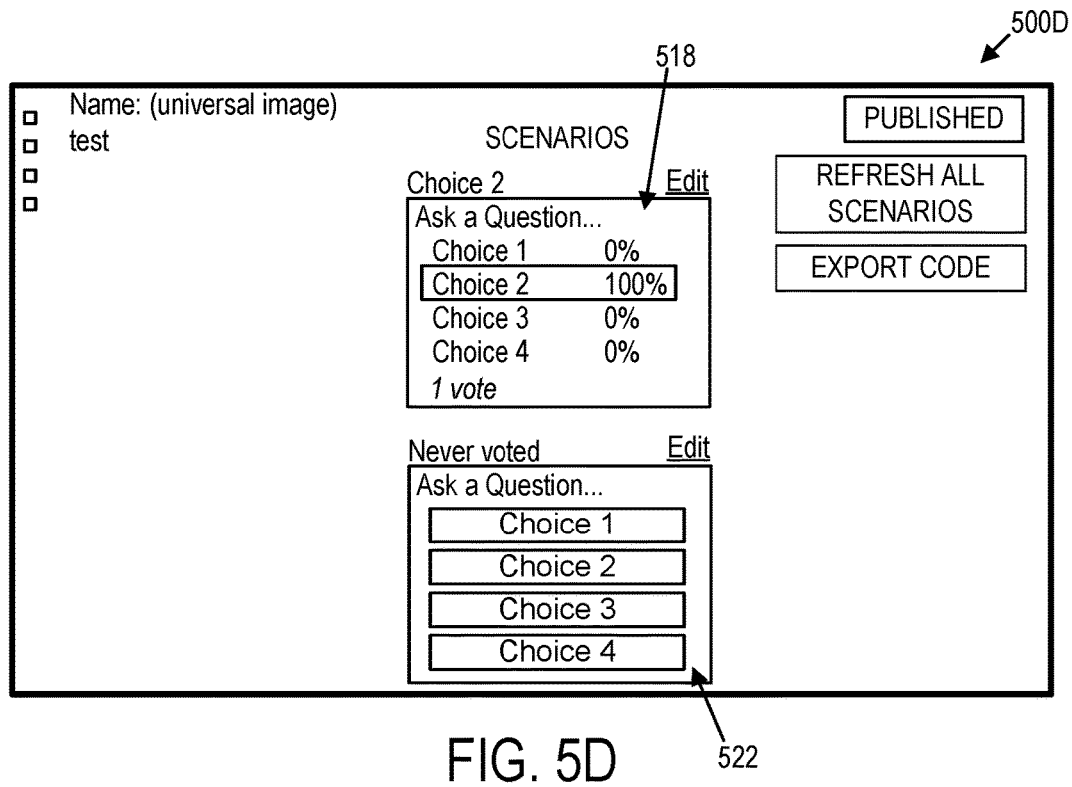

FIG. 5D shows an instance of administrator interface 500D. Within FIG. 5D, interface 500D includes test results in the form of a plurality of interactive graphical content items 518 and 522 that are generated by the dynamic content generator module based on the test values provided by the testing module, enabling the user to review the test results.

In some embodiments, the methods and processes described herein may be tied to a computing system of one or more computing devices. In particular, such methods and processes may be implemented as a computer-application program or service, an application-programming interface (API), a library, and/or other computer-program product.

Previously described FIG. 1 schematically shows a non-limiting embodiment of computing system 100 that can enact one or more of the methods and processes described herein. Computing system 100 is shown in simplified form. Computing system 100 may take the form of one or more personal computers, server computers, tablet computers, home-entertainment computers, network computing devices, gaming devices, mobile computing devices, mobile communication devices (e.g., smart phone), and/or other computing devices.

The logic machines described herein include one or more physical devices configured to execute instructions. For example, a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result. The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machines disclosed herein include one or more physical devices configured to hold instructions executable by a logic machine to implement the methods and processes described herein. When such methods and processes are implemented, the state of the storage machine may be transformed—e.g., to hold different data. The storage machine may include removable and/or built-in devices. The storage machine may include optical memory, semiconductor memory (e.g., RAM, EPROM, EEPROM, etc.), and/or magnetic memory (e.g., hard-disk drive, floppy-disk drive, tape drive, MRAM, etc.), among others. The storage machine may include volatile, nonvolatile, dynamic, static, read/write, read-only, random-access, sequential-access, location-addressable, file-addressable, and/or content-addressable devices. It will be appreciated that the storage machine includes one or more physical devices. However, aspects of the instructions described herein alternatively may be propagated by a communication medium (e.g., an electromagnetic signal, an optical signal, etc.) that is not held by a physical device for a finite duration.

Aspects of a logic machine and a storage machine may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a computing system implemented to perform a particular function. In some cases, a module, program, or engine may be instantiated via a logic machine executing instructions held by a storage machine. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. It will be appreciated that a "service" may be used to describe an application program executable across multiple user sessions. A service may be available to one or more system components, programs, and/or other services. In some implementations, a service may run on one or more server-computing devices.

When included, a graphical display device may be used to present a visual representation of data held by a storage machine. This visual representation may take the form of a graphical user interface (GUI). As the herein described methods and processes change the data held by the storage machine, and thus transform the state of the storage machine, the state of the display may likewise be transformed to visually represent changes in the underlying data. A display may include one or more display devices utilizing virtually any type of technology. Such display devices may be combined with a logic machine and/or a storage machine in a shared enclosure, or such display devices may be peripheral display devices.

When included, input/output interfaces of a computing device or computing system may comprise or interface with one or more user-input devices such as a keyboard, mouse, touch screen, or game controller, and/or networking components. Input/output interfaces can be configured to communicatively couple a computing device or computing system with one or more other computing devices or computing systems. Input/output interfaces may include wired and/or wireless communication devices compatible with one or more different communication protocols. As non-limiting examples, the communication subsystem may be configured for communication via a wireless telephone network, or a wired or wireless local- or wide-area network. In some examples, the input/output interfaces allow messages to be sent and/or received to and/or from other devices via a network such as the Internet.

According to an example of the present disclosure, a method performed by a computing system of one or more computing devices for testing a dynamic content generator module operable within a computer networking environment comprises: at a testing module executed by the computing system: receiving an initial domain for each of a plurality of parameters of a parameter set, the parameter set defining features of content to be generated by the dynamic content generator module; for each parameter of the parameter set, generating a plurality of test values based on the initial domain for that parameter; defining a plurality of test groups in which each test group includes a different combination of test values among the plurality of parameters of the parameter set; providing the plurality of test groups to the dynamic content generator module; and at the dynamic content generator module executed by the computing system: for each test group, dynamically generating a content item based on the combination of test values of that test group as input to a template-rule framework; and outputting the content item for each test group; and at the testing module executed by the computing system: for each content item output by the dynamic content generator module, associating that content item with the test values of the test group from which that content item was generated to obtain associated test result data; and outputting the associated test result data that includes the content item and associated test values. In this example or other examples disclosed herein, the method further comprises: receiving an evaluation input for each content item output by the dynamic content generator module based on the associated test result data of that content item, wherein the evaluation input for at least one content item indicates a failed test result based on testing criteria; and updating the template-rule framework based on the evaluation input indicating the failed test result. In this example or other examples disclosed herein, the method further comprises: at the dynamic content generator module executed by the computing system: for each test group, dynamically generating a plurality of content items in which each content item has a media content type that differs from each other content item of the plurality of graphical content items; and outputting the plurality of content items for each test group. In this example or other examples disclosed herein, the testing module provides the plurality of test groups to the dynamic content generator module by, for each test group: sending a request containing that test group from the testing module to the dynamic content generator module over a wide area communications network; and wherein the content item is output by the dynamic content generator module by sending a response containing the content item to the testing module over the wide area communications network.

According to another example of the present disclosure, a method performed by a computing system of one or more computing devices for testing a dynamic content generator module operable within a computer networking environment comprises: at a testing module executed by the computing system: receiving a user input defining a plurality of test values for a parameter set that defines features of content to be generated by the dynamic content generator module; providing the test values for the parameter set to the dynamic content generator module; and at the dynamic content generator module executed by the computing system: dynamically generating a content item based on the test values of as input to a template-rule framework; and outputting the content item for each test group; and at the testing module executed by the computing system: for each content item output by the dynamic content generator module, associating that content item with the test values from which that content item was generated to obtain associated test result data; and outputting the associated test result data that includes the content item and associated test values.

According to another example of the present disclosure, a computing system of one or more computing devices comprises a storage device having instructions stored thereon executable by a logic machine of the computing system to: receive an initial domain for each of a plurality of parameters of a parameter set, the parameter set defining features of content to be generated; for each parameter of the parameter set, generate a plurality of test values based on the initial domain for that parameter; define a plurality of test groups in which each test group includes a different combination of test values among the plurality of parameters of the parameter set; for each test group, dynamically generate a content item based on the combination of test values of that test group as input to a template-rule framework; for each content item, associate that content item with the test values of the test group from which that content item was generated to obtain associated test result data; and output the associated test result data that includes the content item and associated test values.

According to another example of the present disclosure, a computing system of one or more computing devices comprises a storage device having instructions stored thereon executable by a logic machine of the computing system to: receive a user input defining a plurality of test values for a parameter set that defines features of content to be generated; dynamically generate a content item based on the test values of as input to a template-rule framework; for each content item, associate that content item with the test values from which that content item was generated to obtain associated test result data; and output the associated test result data that includes the content item and associated test values.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system of one or more computing devices for testing a dynamic content generator module operable within a computer networking environment, the method comprising:
    at a testing module executed by the computing system:
        receiving an initial domain for each of a plurality of parameters of a parameter set, the parameter set defining features of content to be generated by the dynamic content generator module;
        for each parameter of the parameter set, generating a plurality of test values based on the initial domain for that parameter;
        defining a plurality of test groups in which each test group includes a different combination of test values among the plurality of parameters of the parameter set;
        providing the plurality of test groups to the dynamic content generator module; and
    at the dynamic content generator module executed by the computing system:
        for each test group, dynamically generating a content item based on the combination of test values of that test group as input to a template-rule framework; and
        outputting the content item for each test group; and
    at the testing module executed by the computing system:
        for each content item output by the dynamic content generator module, associating that content item with the test values of the test group from which that content item was generated to obtain associated test result data; and
        outputting the associated test result data that includes the content item and associated test values.

2. The method of claim 1, further comprising:
    receiving an evaluation input for each content item output by the dynamic content generator module based on the associated test result data of that content item, wherein the evaluation input for at least one content item indicates a failed test result based on testing criteria; and
    updating the template-rule framework based on the evaluation input indicating the failed test result.

3. The method of claim 1, further comprising:
at the dynamic content generator module executed by the computing system:
for each test group, dynamically generating a plurality of content items in which each content item has a media content type that differs from each other content item of the plurality of content items; and
outputting the plurality of content items for each test group.

4. The method of claim 1, wherein the testing module provides the plurality of test groups to the dynamic content generator module by, for each test group:
sending a request containing that test group from the testing module to the dynamic content generator module over a wide area communications network; and
wherein the content item is output by the dynamic content generator module by sending a response containing the content item to the testing module over the wide area communications network.

5. A method performed by a computing system of one or more computing devices for testing a dynamic content generator module operable within a computer networking environment, the method comprising:
at a testing module executed by the computing system:
receiving a user input defining a plurality of test values for a parameter set that defines features of content to be generated by the dynamic content generator module;
providing the test values for the parameter set to the dynamic content generator module; and
at the dynamic content generator module executed by the computing system:
dynamically generating a content item based on the test values of as input to a template-rule framework; and
outputting the content item for each test group; and
at the testing module executed by the computing system:
for each content item output by the dynamic content generator module, associating that content item with the test values from which that content item was generated to obtain associated test result data; and
outputting the associated test result data that includes the content item and associated test values.

6. A computing system of one or more computing devices, comprising:
a storage device having instructions stored thereon executable by a logic machine of the computing system to:
receive an initial domain for each of a plurality of parameters of a parameter set, the parameter set defining features of content to be generated;
for each parameter of the parameter set, generate a plurality of test values based on the initial domain for that parameter;
define a plurality of test groups in which each test group includes a different combination of test values among the plurality of parameters of the parameter set;
for each test group, dynamically generate a content item based on the combination of test values of that test group as input to a template-rule framework;
for each content item, associate that content item with the test values of the test group from which that content item was generated to obtain associated test result data; and
output the associated test result data that includes the content item and associated test values.

\* \* \* \* \*